United States Patent

[11] 3,614,374

| [72] | Inventor | Alvin R. Williams |
| | | Northfield, Ohio |
| [21] | Appl. No. | 51,131 |
| [22] | Filed | June 30, 1970 |
| [23] | | Division of Ser. No. 828,296, May 27, 1969. |
| [45] | Patented | Oct. 19, 1971 |
| [73] | Assignee | United States Steel Corporation |

[54] METHOD OF PRODUCING A WELDED JOINT
4 Claims, 1 Drawing Fig.
[52] U.S. Cl. .................................................. 219/91
[51] Int. Cl. .................................................. B23k 9/28
[50] Field of Search .......................................... 219/91, 92, 80

[56] References Cited
UNITED STATES PATENTS
3,277,268  10/1966  Williams et al. ............... 219/92 X
3,515,841  6/1970  King ............................ 219/92 X Primary Examiner—J. V. Truhe
Assistant Examiner—Hugh D. Jaeger
Attorney—Robert J. Leek, Jr.

ABSTRACT: The method of making a welded joint includes the steps of positioning the S-shaped metal connector provided with a first laminate cavity and a second laminate cavity, disposing the first adhesively bonded laminate in the first laminate cavity, disposing the second adhesively bonded laminate in the second laminate cavity, and welding the first adhesively bonded laminate and the second adhesively bonded laminate to the metal connector.

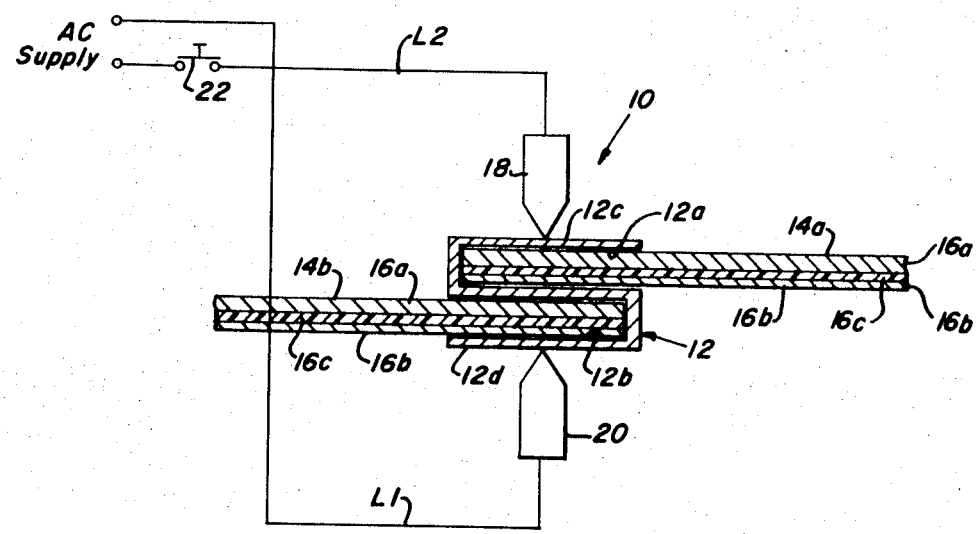

METHOD OF PRODUCING A WELDED JOINT

CROSS-REFERENCE TO RELATED APPLICATIONS

This application is a divisional application of U.S. Pat. application Ser. No. 828,296 filed May 27, 1969 by applicant and assigned to the same assignee as this application.

BACKGROUND OF THE INVENTION

Heretofore, the adhesive in an adhesively bonded laminate acted as a heat and electrical insulator between the first metal member and the second metal member of the laminate, thereby rendering impossible the resistance welding of the laminate to another laminate. Welding was accomplished by fastening the two laminates tightly together with one or more rivets or bolts and then applying the welding current. However, this method requires the step of punching or drilling holes in the laminates to be welded.

I am aware of the following conventional prior art welding methods and apparatus:

| U.S. Patent No. | Inventor | Issued |
| --- | --- | --- |
| 1,568,080 | Meadowcroft | 1/5/26 |
| 2,452,805 | Sussenbach | 11/2/48 |
| 3,036,200 | Keefe | 5/22/62 |
| 3,277,268 | Williams et al. | 10/4/66 |

OBJECTS OF THE INVENTION

It is the general object of this invention to avoid and overcome the foregoing and other difficulties of and objections to prior art practices by the provision of a method of producing a welded joint which:

a. satisfactorily welds a first adhesively bonded laminate to a second adhesively bonded laminate, and b. eliminates the conventional drilling and riveting of the lapped laminates prior to welding.

BRIEF SUMMARY OF THE INVENTION

The aforesaid objects of this invention, and other objects which will become apparent as the description proceeds, are achieved by providing a method of producing a welded joint.

The method of making a welded joint includes the steps of positioning the S-shaped metal connector provided with a first laminate cavity and a second laminate cavity, disposing the first adhesively bonded laminate in the first laminate cavity, disposing the second adhesively bonded laminate in the second laminate cavity, and welding the first adhesively bonded laminate and the second adhesively bonded laminate to the metal connector.

BRIEF DESCRIPTION OF THE VIEWS OF THE DRAWING

For a better understanding of this invention reference should be had to the accompanying drawing, wherein like numerals of reference indicate similar parts throughout the several views and wherein the sole FIGURE is a fragmentary schematic sectional view of the apparatus for forming a welded joint between two adhesively bonded laminates.

Although the principles of this invention are broadly applicable to welding of joints between metal parts, this invention is particularly adapted for use in conjunction with a method for the forming of a welded joint between two adhesively bonded laminate hence it has been so illustrated and will be so described.

DETAILED DESCRIPTION

With specific reference to the form of this invention illustrated in the drawing, an apparatus for making a welded joint is indicated generally by the reference numeral 10.

This apparatus 10 has an S-shaped metal connector 12 positioned adjacent a welding zone. The connector 12 is provided with a first laminate cavity 12a and a second laminate cavity 12b and has a first contact surface 12c and a second contact surface 12d.

A first adhesively bonded laminate 14a is disposed or positioned in the first laminate cavity 12a and a second adhesively bonded laminate 14b is positioned in the second laminate cavity 12b. Each of the laminates 14a,14b, has a first metal member, such as a stainless steel strip 16a or the like, a second metal member, suitably an aluminum strip 16b or the like, and an electrically insulating adhesive, such as CYBOND 4000 adhesive 16c. CYBOND is the trade name of American Cyanamid Laboratories for a polyurethane adhesive. The laminates 14a,14b are positioned in the first laminate cavity 12a, and the second laminate cavity 12b respectively so that the stainless steel strips 16a and aluminum strips 16b are in contact with the metal connector 12.

A first welding electrode 18 is in contact with one surface of the first contact surface 12c and the second contact surface 12d (in this case the first contact surface 12c) and a second welding electrode 20 is in contact with the outer surface of the first contact surface 12c and the second contact surface 12d (i.e. the second contact surface 12d).

The electrodes 18,20 are connected by lines L1,L2 and in line L2 through a switch 22 to a voltage supply indicated by the legend "AC Supply," The electrodes 18,20 weld, as by electric resistance welding, the laminates 14a,14b to the metal connector 12 to form the welded joint.

It will be understood that the laminates 14a,14b may be other laminates, such as stainless steel on galvanized steel, aluminum on steel, copper on aluminum, bronze on galvanized, stainless steel on lead or the like. It will be understood that one laminate of the first adhesively bonded laminate 14a and the second adhesively bonded laminate 14b may be formed of a metal other than the metal in either the first metal member 16a or the second metal member 16b and are designated for claim purposes herein as a third metal member or a fourth metal member. Further, other adhesives, such as the following may be employed;

| Trade Mark or Trade Name | Manufacturer |
| --- | --- |
| "Surlyn" A ionomer resin | E. I. duPont de Nemours & Company |
| "Bakelite" phenoxy resins PKHH and PAHJ | Union Carbide Corporation |
| "Scotch-Held" brand structural adhesives | 3M Company |
| A-1103-B adhesive | B. F. Goodrich Industrial Products Company |
| USS "Nexus" PQE-1 polymeric material | United States Steel Corporation |

WELDED JOINT

A welded joint is provided utilizing the S-shaped metal connector 12, which connector 12 is provided with the first laminate cavity 12a and the second laminate cavity 12b. The first adhesively bonded laminate 14a is disposed in the first laminate cavity 12a and the second adhesively bonded laminate 14b is disposed in the second laminate cavity 12b. The first adhesively bonded laminate 14a and the second adhesively bonded laminate 14b each have the first metal member 16a, the second metal member 16b and the electrically insulating adhesive 16c between the first metal member 16a and the second metal member 16b. The first adhesively bonded laminate 14a and the second adhesively bonded laminate 14b are disposed in the first laminate cavity 12a and the second laminate cavity 12b respectively so that the first metal members 16a and the second metal members 16b are in contact with the metal connector 12 and are welded together.

METHOD

A method is also provided of making a welded joint including the steps of positioning an S-shaped metal connector 12 provided with the first laminate cavity 12a and the second laminate cavity 12b, disposing the first adhesively bonded laminate 14a in the first laminate cavity 12a, and disposing the second adhesively bonded laminate 14b in the second laminate cavity 12b so that the first metal members 16a and the second metal members 16b are in contact with the metal connector 12.

The first adhesively bonded laminate 14a and the second adhesively bonded laminate 14b have the first metal member 16a, the second metal member 16b and the electrically insulating adhesive 16c between the first metal member 16a and the second metal member 16b. Also included is the step of welding the first adhesively bonded laminate 14a and the second adhesively bonded laminate 14b to the metal connector 12 to form the welded joint.

As shown in the drawing the first laminate cavity 12a and the second laminate cavity 12b may provide a clearance fit for the first laminate 14a and the second laminate 14b and the electrodes 18,20 may force the metal surfaces into contact. Alternatively a snug fit may be provided and the laminates 14a, 14b forced into the cavities 12a,12b to form the desired metal contact.

SUMMARY OF THE ACHIEVEMENT OF THE OBJECTS OF THE INVENTION

It will be recognized by those skilled in the art that the objects of this invention have been achieved by providing a method of producing a welded joint and the welded joint thereby which:

a. satisfactorily welds a first adhesively bonded laminate 14a to a second adhesively bonded laminate 14b, and b. eliminates the conventional drilling and riveting of the lapped laminates 14a,14b prior to welding.

While in accordance with the patent statutes preferred and alternative embodiments of this invention have been illustrated and described in detail, it is to be particularly understood that the invention is not limited thereto or thereby.

I claim:

1. A method of making a welded joint including the steps of:
   a. positioning an S-shaped metal connector provided with a first laminate cavity and a second laminate cavity,
   b. disposing a first adhesively bonded laminate having a first metal member, a second metal member, and an electrically insulating adhesive member between said first metal member and said second metal member in said first laminate cavity so that said first metal member and said second metal member are in contact with said metal connector,
   c. disposing a second adhesively bonded laminate having a first metal member, a second metal member, and an electrically insulating adhesive member between said first metal member and said second metal member in said second laminate cavity so that said first metal member and said second metal member are in contact with said metal connector, and
   d. electrically welding said first adhesively bonded laminate and said second adhesively bonded laminate to said metal connector.

2. The method recited in claim 1 wherein one laminate of said first adhesively bonded laminate and said second adhesively bonded laminate has a third metal member formed of a metal other than the metal in said first metal member in lieu of said first metal member, said second metal member and an electrically insulating adhesive between said third metal member and said second metal member.

3. The method recited in claim 1 wherein one laminate of said first adhesively bonded laminate and said second adhesively bonded laminate has said first metal member, a third metal member formed of a metal other than the metal in said second metal member in lieu of said second metal member and an electrically insulating adhesive between said first metal member and said third metal member.

4. The method recited claim 1 wherein one laminate of said first adhesively bonded laminate and said second adhesively bonded laminate has a third metal member formed of a metal other than the metal in said first metal member in lieu of said first metal member, a fourth metal member formed of metal other than the metal in said second metal member in lieu of said second metal member and an electrically insulating adhesive between said third metal member and said fourth metal member.